(12) United States Patent
Kräuter

(10) Patent No.: US 8,863,610 B2
(45) Date of Patent: Oct. 21, 2014

(54) STEERING COLUMN FOR A MOTOR VEHICLE

(71) Applicant: Audi AG, Ingolstadt (DE)

(72) Inventor: Thomas Kräuter, Gaimersheim (DE)

(73) Assignee: Audi AG, Ingolstadt (DE)

( * ) Notice: Subject to any disclaimer, the term of this patent is extended or adjusted under 35 U.S.C. 154(b) by 142 days.

(21) Appl. No.: 13/692,440

(22) Filed: Dec. 3, 2012

(65) Prior Publication Data

US 2013/0139637 A1    Jun. 6, 2013

(30) Foreign Application Priority Data

Dec. 3, 2011    (DE) .......................... 10 2011 120 304

(51) Int. Cl.
| | |
|---|---|
| *B62D 1/183* | (2006.01) |
| *B62D 1/184* | (2006.01) |
| *B62D 1/19* | (2006.01) |
| *B62D 1/181* | (2006.01) |

(52) U.S. Cl.
CPC ............... *B62D 1/183* (2013.01); *B62D 1/181* (2013.01); *B62D 1/184* (2013.01); *B62D 1/195* (2013.01); *B62D 1/19* (2013.01)
USPC .............................. 74/496; 280/777; 280/775

(58) Field of Classification Search
CPC ........ B62D 1/183; B62D 1/184; B62D 1/195; B62D 1/11; B62D 1/19
USPC .............................. 280/775, 777; 74/493, 495
See application file for complete search history.

(56) References Cited

U.S. PATENT DOCUMENTS

| | | | | |
|---|---|---|---|---|
| 2,988,931 | A | * | 6/1961 | Markley, Jr. et al. ............ 74/556 |
| 6,070,686 | A | * | 6/2000 | Pollmann ...................... 180/287 |
| 2004/0144192 | A1 | * | 7/2004 | Tomaru et al. .................. 74/492 |
| 2007/0080531 | A1 | | 4/2007 | Min |
| 2013/0174686 | A1 | * | 7/2013 | Hirche et al. ................... 74/495 |

FOREIGN PATENT DOCUMENTS

| | | |
|---|---|---|
| DE | 101 37 971 | 2/2003 |
| DE | 103 37 585 A1 | 3/2005 |
| DE | 102004024876 | 4/2005 |
| DE | 102005056055 | 4/2007 |
| DE | 101 61 849 B4 | 9/2010 |
| DE | 102010013522 | 10/2010 |
| JP | 2004-161242 | 6/2004 |
| WO | WO 2006/108631 | 10/2006 |

* cited by examiner

*Primary Examiner* — Drew Brown
(74) *Attorney, Agent, or Firm* — Henry M. Feiereisen LLC

(57) ABSTRACT

A steering column for a motor vehicle includes a mounting and a carriage received in a guideway of the mounting for movement between a rearward starting position and a forward end position. Arranged between the carriage and the mounting is an actuatable locking device to lock the starting position of the carriage during normal travel and, when being released, to allow a shift of the carriage to the forward end position together with the steering wheel to thereby facilitate entry of the driver. The locking device has at least one predetermined breaking element dimensioned to either break or to become deformed sufficient to release the locking device and to allow the carriage to move from the starting position to the end position, when an impacting predefined crash force is exceeded in the event of a crash.

14 Claims, 1 Drawing Sheet

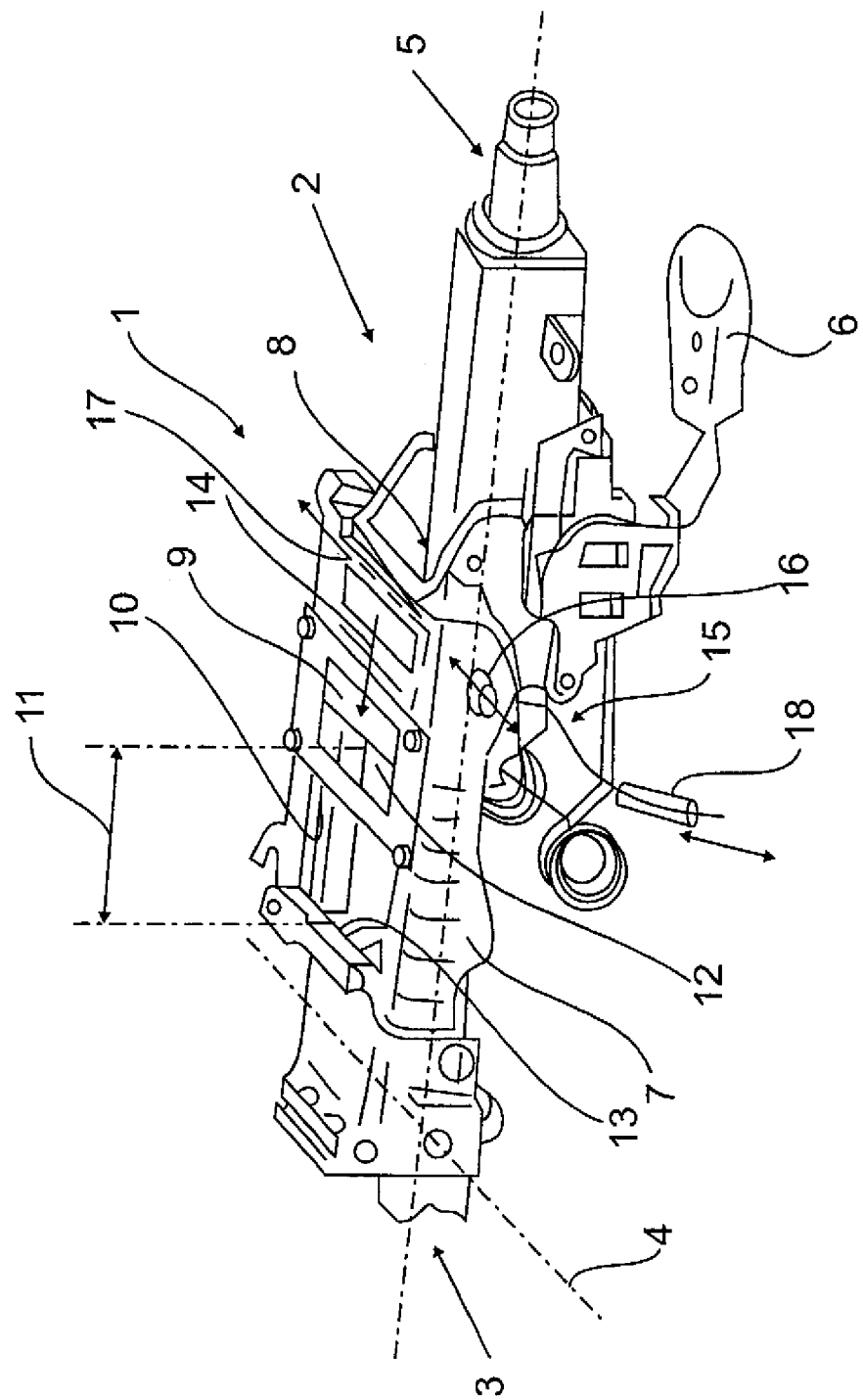

STEERING COLUMN FOR A MOTOR VEHICLE

CROSS-REFERENCES TO RELATED APPLICATIONS

This application claims the priority of German Patent Application, Serial No. DE 10 2011 120 304.8, filed Dec. 3, 2011, pursuant to 35 U.S.C. 119(a)-(d), the content of which is incorporated herein by reference in its entirety as if fully set forth herein.

BACKGROUND OF THE INVENTION

The present invention relates to a steering column for a motor vehicle.

It would therefore be desirable and advantageous to provide an improved a steering column for a motor vehicle to obviate prior art shortcomings and to enable a driver to easily enter and exit the motor vehicle.

SUMMARY OF THE INVENTION

According to one aspect of the present invention, a steering column for a motor vehicle includes a mounting for securement to a vehicle body, a carriage received in a guideway of the mounting for movement along a predefined path between a rearward starting position in which the carriage is positioned proximal to a driver during normal travel and a forward end position to which the carriage is movable away from the driver when an impacting predefined crash force is exceeded in the event of a crash, a telescoping column portion arranged in an area of the mounting and having a telescope section connected to a steering wheel and to the carriage, and an actuatable locking device arranged between the carriage and the mounting, the locking device being constructed to lock the starting position of the carriage during normal travel and, when being released, to allow a shift of the carriage to the forward end position together with the steering wheel to thereby facilitate entry of the driver, the locking device having at least one predetermined breaking element dimensioned to either break or to become deformed sufficient to release the locking device and to allow the carriage to move from the starting position to the end position, when the impacting predefined crash force is exceeded in the event of a crash.

In accordance with the present invention, the predefined path by which the carriage can be moved is used as a retraction of the steering wheel, optionally as additional retraction in combination with an existing individually actuatable length adjustment of the steering wheel, so as to facilitate entry into or exit from the motor vehicle. This dual function of the carriage is realized by the presence of the locking device which fixes the carriage in place during normal travel of the motor vehicle, and which, when released, liberates the carriage so that the carriage can now be used as entry aid that is movable by the driver with the steering wheel to the forward end position. In addition, the presence of the predetermined breaking element which breaks or deforms when the impacting predefined crash force is exceeded in the event of a crash, enables a release of the locking device so that the carriage is movable from the rearward starting position to the forward end position in the event of such a crash.

The carriage thus provides an entry aid that can be operated so that the driver can comfortably get in and out of the motor vehicle, while the provision of the locking device with its predetermined breaking element maintains its function as safety feature. The predetermined breaking element may represent a kind of deformation element which is able to absorb crash energy, when suitably dimensioning the load at break or deformation geometry to thereby advantageously reduce the energy impacting the driver in the event of an impact upon the steering wheel.

It is advantageous that the use of the carriage as entry aid does not change for the driver the individual steering wheel adjustment for the travel mode so that the previously adjusted position of the steering wheel is reestablished after the driver has entered the motor vehicle and the carriage has returned to its starting position.

According to another advantageous feature of the present invention, the locking device can be constructed as a spring-biased latching device having at least one predetermined breaking pin which spontaneously locks in place when the carriage assumes the starting position. Advantageously, the latching device can be arranged on the carriage, with the at least one predetermined breaking pin configured for engagement in a recess of the mounting. The predetermined breaking pin may, for example, be configured as a simple bolt with a Bowden cable control.

According to another advantageous feature of the present invention, a locking element may be provided to maintain the locking device in a locked position so as to prevent a release of the carriage during normal travel, and to release the locking device when the motor vehicle is at a standstill, e.g. when an internal combustion engine of the motor vehicle has been shut down. Advantageously, the locking device may be operably connected to the internal combustion engine of the motor vehicle as to enable operation of the internal combustion engine or driving of the motor vehicle only when the locking device locks the carriage in the starting position.

According to another advantageous feature of the present invention, the locking device may be constructed for actuation by hand or by a control element, e.g. a pushbutton.

According to another advantageous feature of the present invention, the carriage may be shiftable to the forward end position by hand using the steering wheel of the motor vehicle or in a controlled manner by an electric, pneumatic, or hydraulic actuator, depending on the situation at hand and the optional package provided for a motor vehicle. Suitably, the locking device and the carriage can be operably connected to one another so as to couple an actuation of the locking device with a shift of the carriage, when an automated mode of operation is involved.

According to another advantageous feature of the present invention, a device for allowing a driver to individually adjust a length or height of the steering column may be provided in addition to the entry aid in the form of the carriage, whereby the device operates independently from the carriage and is thus not affected by a shift of the carriage.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a perspective view of a steering column from a viewing direction that is from the rear on the right-hand side to laterally oblique to the front on the left-hand side of the drawing.

DETAILED DESCRIPTION OF PREFERRED EMBODIMENTS

The depicted embodiment is to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a perspective view of a steering column, generally designated by reference numeral 1 and having a rearward column section 2 and a forward column section 3 (not shown in greater detail), with the rearward column section 2 being connected to the forward column section 3 via a universal joint. The rearward column section 2 is of telescoping construction so as to enable individual length adjustment and is swingably mounted about a transverse axis 4 for allowing a height adjustment. In the assembled state, a not shown steering wheel is mounted to an end 5 of the rearward column section 2. The individual length and height adjustments of the steering wheel are implemented via a hand lever 6 which, when released, allows a driver to individually adjust the length and height to suit the size of the driver. Once adjusted, the hand lever 6 is locked again to secure the adjustment.

The rearward column section 2 is arranged in a mounting 7 which can be fixedly secured to the vehicle body. A telescoping section 8 of the rearward column section 2 is connected directly or indirectly with the steering wheel (not shown) and to a carriage 9, also called "crash carriage". The carriage 9 is guided in the mounting 7 in a guideway 10 for movement along a predefined carriage path 11. During travel, the carriage 9 is positioned in a rearward starting position 12 that is proximal to the driver and can be shifted to a forward end position 13 in a direction of arrow 14 in the event of a crash that exceeds a predefined crash force impact.

The carriage 9 is held in place and locked in the starting position 12 by an actuatable locking device 15 which is shown schematically here only by way of example in the form of a latching device on the carriage 9. The locking device 15 has on each of both sides a spring-biased bolt to establish a predetermined breaking pin 16, 17 for engagement in a complementary recess of the mounting 7. The predetermined breaking pins 16, 17 are dimensioned to break at a break load above the predefined crash force impact in order to release the locked starting position 12 of the carriage 9. The locking device 15 can, however, also be released via a Bowden cable 18, shown only schematically, through retraction of the predetermined breaking pins 16, 17. Thus, the carriage 9 can be moved as entry aid to the forward end position 13 by shifting the steering wheel so as to expand the exit and entry area for the driver. After entry into the motor vehicle, the driver can then pull with the steering wheel the rearward column section 2 with the carriage 9 back into the starting end position 12 which is spontaneously locked and held in place by the locking device 15 through engagement of the predetermined breaking pins 16, 17 in the respective recesses of the mounting 7.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A steering column for a motor vehicle, comprising:
    a mounting for securement to a vehicle body;
    a carriage received in a guideway of the mounting for movement along a predefined path between a rearward starting position in which the carriage is positioned proximal to a driver during normal travel and a forward end position to which the carriage is movable away from the driver when an impacting predefined crash force is exceeded in the event of a crash;
    a telescoping column portion arranged in an area of the mounting and having a telescope section connected to a steering wheel and to the carriage; and
    an actuatable locking device arranged between the carriage and the mounting, said locking device being constructed to lock the starting position of the carriage during normal travel and, when being released, to allow a shift of the carriage to the forward end position together with the steering wheel to thereby facilitate entry of the driver, said locking device having at least one predetermined breaking element dimensioned to either break or to become deformed sufficient to release the locking device and to allow the carriage to move from the starting position to the end position, when the impacting predefined crash force is exceeded in the event of a crash.

2. The steering column of claim 1, constructed for use in a passenger car.

3. The steering column of claim 1, wherein the locking device is constructed as a spring-biased latching device having at least one predetermined breaking pin which spontaneously locks in place when the carriage assumes the starting position.

4. The steering column of claim 3, wherein the latching device is arranged on the carriage, said at least one predetermined breaking pin configured for engagement in a recess of the mounting.

5. The steering column of claim 1, further comprising a locking element constructed to maintain the locking device in a locked position so as to prevent a release of the carriage during normal travel, and to release the locking device when the motor vehicle is at a standstill.

6. The steering column of claim 5, wherein the locking device is released by the locking element, when an internal combustion engine of the motor vehicle is shut down.

7. The steering column of claim 1, wherein the locking device is operably connected to an internal combustion engine of the motor vehicle as to enable operation of the internal combustion engine or driving of the motor vehicle only when the locking device locks the carriage in the starting position.

8. The steering column of claim 1, wherein the locking device is constructed for actuation by hand.

9. The steering column of claim 1, wherein the locking device is constructed for actuation by a control element.

10. The steering column of claim 9, wherein the control element is a pushbutton.

11. The steering column of claim 1, wherein the carriage is shiftable to the forward end position by hand using a steering wheel of the motor vehicle.

12. The steering column of claim 1, further comprising an electric, pneumatic, or hydraulic actuator to control a shift of the carriage to the forward end position.

13. The steering column of claim 1, wherein the locking device and the carriage are operably connected to one another so as to couple an actuation of the locking device with a shift of the carriage.

14. The steering column of claim 1, further comprising a device constructed to enable a driver to individually adjust a length or height of the steering column in addition to a movement of the carriage.

* * * * *